United States Patent
Martch et al.

(10) Patent No.: US 9,894,406 B2
(45) Date of Patent: *Feb. 13, 2018

(54) STORING MULTIPLE INSTANCES OF CONTENT

(71) Applicant: ECHOSTAR TECHNOLOGIES L.L.C., Englewood, CO (US)

(72) Inventors: Henry Gregg Martch, Parker, CO (US); David A. Kummer, Highlands Ranch, CO (US); John T. Kennedy, Denver, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/860,366

(22) Filed: Sep. 21, 2015

(65) Prior Publication Data
US 2016/0105711 A1    Apr. 14, 2016

Related U.S. Application Data

(63) Continuation of application No. 13/302,852, filed on Nov. 22, 2011, now Pat. No. 9,185,331.

(Continued)

(51) Int. Cl.
| | |
|---|---|
| H04N 21/433 | (2011.01) |
| H04N 21/426 | (2011.01) |
| H04N 21/2347 | (2011.01) |
| H04N 21/2365 | (2011.01) |
| H04N 5/76 | (2006.01) |
| H04N 9/806 | (2006.01) |
| H04N 21/4408 | (2011.01) |
| H04N 21/438 | (2011.01) |
| H04N 21/458 | (2011.01) |
| H04N 5/913 | (2006.01) |

(52) U.S. Cl.
CPC .......... *H04N 21/4334* (2013.01); *H04N 5/76* (2013.01); *H04N 9/8063* (2013.01);
(Continued)

(58) Field of Classification Search
CPC .......... H04N 21/4623; H04N 21/4405; H04N 21/26606; H04N 21/63345;
(Continued)

(56) References Cited

U.S. PATENT DOCUMENTS

| | | |
|---|---|---|
| 4,706,121 A | 11/1987 | Young |
| 4,723,246 A | 2/1988 | Weldon, Jr. |

(Continued)

FOREIGN PATENT DOCUMENTS

| | | |
|---|---|---|
| CN | 1595975 A | 3/2005 |
| CN | 1615017 A | 5/2005 |

(Continued)

OTHER PUBLICATIONS

U.S. Appl. No. 14/340,190, filed Jul. 24, 2014, Final Rejection dated Feb. 19, 2016, 54 pages.
(Continued)

*Primary Examiner* — Tae Kim
(74) *Attorney, Agent, or Firm* — Kilpatrick Townsend & Stockton LLP

(57) ABSTRACT

Content receivers may simultaneously record multiple instances of content for multiple programming channels based on content provider instructions. Systems and methods utilize the content receivers to record these multiple instances from at least a single transponder. In some instances, multiple transponders may have a common control word so that content carried on each such transponder may be simultaneously received, decoded and recorded. Further, a single demodulator may be associated with multiple tuners, so that the single demodulator processes all content received from transponders with common control words and/or other encryption mechanisms.

18 Claims, 2 Drawing Sheets

Related U.S. Application Data

(60) Provisional application No. 61/526,665, filed on Aug. 23, 2011.

(52) U.S. Cl.
CPC ..... *H04N 21/2347* (2013.01); *H04N 21/2365* (2013.01); *H04N 21/4263* (2013.01); *H04N 21/42623* (2013.01); *H04N 21/4383* (2013.01); *H04N 21/4408* (2013.01); *H04N 21/458* (2013.01); *H04N 5/913* (2013.01)

(58) Field of Classification Search
CPC ............. H04N 21/4263; H04N 21/434; H04N 21/4383; H04N 21/6143; H04N 5/76
See application file for complete search history.

(56) References Cited

U.S. PATENT DOCUMENTS

| | | | |
|---|---|---|---|
| 4,802,215 A | 1/1989 | Mason | |
| 5,187,589 A | 2/1993 | Kono et al. | |
| 5,335,277 A | 8/1994 | Harvey et al. | |
| 5,483,277 A | 1/1996 | Granger | |
| 5,488,658 A | 1/1996 | Hirashima | |
| 5,541,738 A | 7/1996 | Mankovitz | |
| 5,608,652 A | 3/1997 | Astle | |
| 5,642,153 A | 6/1997 | Chaney et al. | |
| 5,682,597 A | 10/1997 | Ganek et al. | |
| 5,684,969 A | 11/1997 | Ishida | |
| 5,724,646 A | 3/1998 | Ganek et al. | |
| 5,805,763 A | 9/1998 | Lawler et al. | |
| 5,974,218 A | 10/1999 | Nagasaka et al. | |
| 6,049,333 A | 4/2000 | LaJoie et al. | |
| 6,263,504 B1 | 7/2001 | Ebisawa | |
| 6,351,474 B1* | 2/2002 | Robinett | H04N 21/23424 370/468 |
| 6,453,115 B1 | 9/2002 | Boyle | |
| 6,628,891 B1 | 9/2003 | Vantalon et al. | |
| 6,687,296 B1 | 2/2004 | Sato et al. | |
| 6,701,528 B1 | 3/2004 | Arsenault et al. | |
| 6,728,883 B1 | 4/2004 | Kohashi et al. | |
| 6,766,523 B2 | 7/2004 | Herley | |
| 6,771,703 B1 | 8/2004 | Oguz et al. | |
| 6,798,971 B2 | 9/2004 | Potrebic | |
| 6,938,208 B2 | 8/2005 | Reichardt | |
| 7,024,676 B1 | 4/2006 | Klopfenstein | |
| 7,062,048 B2* | 6/2006 | Livaditis | H04N 7/162 348/E5.004 |
| 7,409,140 B2 | 8/2008 | Rodriguez et al. | |
| 7,487,529 B1 | 2/2009 | Orlick | |
| 7,490,169 B1 | 2/2009 | Ogdon et al. | |
| 7,493,312 B2 | 2/2009 | Liu et al. | |
| 7,505,081 B2 | 3/2009 | Eshleman | |
| 7,533,402 B2* | 5/2009 | Demas | H04N 21/2365 345/1.1 |
| 7,542,656 B2 | 6/2009 | Cho et al. | |
| 7,577,751 B2 | 8/2009 | Vinson et al. | |
| 7,590,993 B1 | 9/2009 | Hendricks et al. | |
| 7,684,672 B2 | 3/2010 | Matoba | |
| 7,715,552 B2 | 5/2010 | Pinder et al. | |
| 7,730,517 B1 | 6/2010 | Rey et al. | |
| 7,739,711 B2 | 6/2010 | Finseth et al. | |
| 7,760,986 B2 | 7/2010 | Beuque | |
| 7,804,861 B2 | 9/2010 | Kim | |
| 7,848,618 B2 | 12/2010 | Potrebic et al. | |
| 7,856,557 B2 | 12/2010 | Beuque | |
| 7,925,141 B2 | 4/2011 | Geer et al. | |
| 7,926,078 B2 | 4/2011 | Arsenault et al. | |
| 7,929,697 B2* | 4/2011 | McNeely | H04B 7/18523 380/200 |
| 7,962,937 B2 | 6/2011 | Cho et al. | |
| 8,006,268 B2 | 8/2011 | Sloo | |
| 8,201,194 B2 | 6/2012 | Wijnands et al. | |
| 8,321,466 B2 | 11/2012 | Black et al. | |
| 8,364,671 B1 | 1/2013 | Sinton et al. | |
| 8,437,622 B2 | 5/2013 | Casagrande | |
| 8,447,170 B2 | 5/2013 | Casagrande | |
| 8,566,873 B2 | 10/2013 | Sie et al. | |
| 8,584,167 B2 | 11/2013 | Vanduyn | |
| 8,606,088 B2 | 12/2013 | Kummer et al. | |
| 8,627,349 B2 | 1/2014 | Kirby et al. | |
| 8,660,412 B2 | 2/2014 | Kummer et al. | |
| 8,763,027 B2 | 6/2014 | Martch | |
| 8,774,608 B2 | 7/2014 | Kummer et al. | |
| 8,819,722 B2 | 8/2014 | Kummer et al. | |
| 8,819,761 B2 | 8/2014 | Minnick | |
| 8,850,476 B2 | 9/2014 | VanDuyn et al. | |
| 8,867,893 B2 | 10/2014 | Kirby | |
| 8,959,544 B2 | 2/2015 | Kummer et al. | |
| 8,959,566 B2 | 2/2015 | Kummer | |
| 8,989,562 B2 | 3/2015 | Kummer et al. | |
| 8,997,153 B2 | 3/2015 | Templeman | |
| 9,031,385 B2 | 5/2015 | Casagrande et al. | |
| 9,043,843 B2 | 5/2015 | Templeman et al. | |
| 9,055,274 B2 | 6/2015 | Casagrande | |
| 9,088,763 B2 | 7/2015 | Martch et al. | |
| 9,113,222 B2 | 8/2015 | VanDuyn | |
| 9,177,605 B2 | 11/2015 | Minnick et al. | |
| 9,177,606 B2 | 11/2015 | Kirby | |
| 9,185,331 B2 | 11/2015 | Martch et al. | |
| 9,191,694 B2 | 11/2015 | Casagrande | |
| 9,202,524 B2 | 12/2015 | Martch et al. | |
| 9,264,779 B2 | 2/2016 | Kirby et al. | |
| 9,269,397 B2 | 2/2016 | Casagrande et al. | |
| 9,349,412 B2 | 5/2016 | Templeman | |
| 9,350,937 B2 | 5/2016 | Kummer et al. | |
| 9,357,159 B2 | 5/2016 | Martch et al. | |
| 9,361,940 B2 | 6/2016 | Minnick | |
| 9,412,413 B2 | 8/2016 | Martch | |
| 9,489,981 B2 | 11/2016 | Templeman et al. | |
| 9,489,982 B2 | 11/2016 | Casagrande et al. | |
| 9,521,440 B2 | 12/2016 | Kummer et al. | |
| 9,549,213 B2 | 1/2017 | Templeman et al. | |
| 9,621,946 B2 | 4/2017 | Kennedy | |
| 9,628,838 B2 | 4/2017 | Kummer et al. | |
| 9,635,436 B2 | 4/2017 | Casagrande | |
| 9,756,378 B2 | 9/2017 | Hardy | |
| 2001/0028782 A1 | 10/2001 | Ohno et al. | |
| 2001/0033736 A1 | 10/2001 | Yap et al. | |
| 2001/0034787 A1 | 10/2001 | Takao et al. | |
| 2002/0044658 A1 | 4/2002 | Wasilewski et al. | |
| 2002/0054752 A1 | 5/2002 | Wood et al. | |
| 2002/0055343 A1 | 5/2002 | Stetzler et al. | |
| 2002/0087979 A1 | 7/2002 | Dudkiewicz et al. | |
| 2002/0087983 A1 | 7/2002 | Son et al. | |
| 2002/0092021 A1 | 7/2002 | Yap et al. | |
| 2002/0095510 A1* | 7/2002 | Sie | H04N 7/17336 709/231 |
| 2002/0097340 A1 | 7/2002 | Takagi et al. | |
| 2002/0116705 A1 | 8/2002 | Perlman | |
| 2002/0120925 A1 | 8/2002 | Logan | |
| 2002/0126221 A1 | 9/2002 | Link | |
| 2002/0141431 A1 | 10/2002 | Tripathy | |
| 2002/0144259 A1 | 10/2002 | Gutta et al. | |
| 2002/0144266 A1 | 10/2002 | Goldman et al. | |
| 2002/0152299 A1 | 10/2002 | Traversat et al. | |
| 2002/0164147 A1 | 11/2002 | Suda | |
| 2002/0168178 A1 | 11/2002 | Rodriguez et al. | |
| 2002/0174430 A1 | 11/2002 | Ellis et al. | |
| 2002/0184638 A1 | 12/2002 | Agnihotri et al. | |
| 2002/0188943 A1 | 12/2002 | Freeman et al. | |
| 2003/0005454 A1 | 1/2003 | Rodriguez et al. | |
| 2003/0026423 A1 | 2/2003 | Unger et al. | |
| 2003/0078930 A1 | 4/2003 | Surcouf et al. | |
| 2003/0097659 A1 | 5/2003 | Goldman | |
| 2003/0110514 A1 | 6/2003 | West et al. | |
| 2003/0149988 A1 | 8/2003 | Ellis et al. | |
| 2003/0152360 A1 | 8/2003 | Mukai et al. | |
| 2003/0156826 A1 | 8/2003 | Sonoda et al. | |
| 2003/0177492 A1 | 9/2003 | Kanou | |
| 2003/0177495 A1 | 9/2003 | Needham et al. | |
| 2003/0200548 A1 | 10/2003 | Baran et al. | |
| 2003/0208763 A1 | 11/2003 | McElhatten et al. | |
| 2003/0208767 A1 | 11/2003 | Williamson et al. | |
| 2003/0226150 A1 | 12/2003 | Berberet et al. | |

(56) References Cited

U.S. PATENT DOCUMENTS

| | | |
|---|---|---|
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1 | 4/2004 | Kessler et al. |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0148501 A1* | 7/2004 | Livaditis ............... H04N 7/162 713/161 |
| 2004/0162871 A1 | 8/2004 | Pabla et al. |
| 2004/0218905 A1* | 11/2004 | Green ................... H04N 5/76 386/243 |
| 2004/0242150 A1 | 12/2004 | Wright et al. |
| 2004/0268387 A1 | 12/2004 | Wendling |
| 2005/0002640 A1 | 1/2005 | Putterman |
| 2005/0034171 A1 | 2/2005 | Benya |
| 2005/0071877 A1* | 3/2005 | Navarro ................ H04H 40/90 725/68 |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0144646 A1* | 6/2005 | Lecrom ................ G11B 27/005 725/100 |
| 2005/0147383 A1 | 7/2005 | Ihara |
| 2005/0180568 A1 | 8/2005 | Krause |
| 2005/0229213 A1 | 10/2005 | Ellis et al. |
| 2005/0237435 A1 | 10/2005 | Potrebic et al. |
| 2005/0267656 A1 | 12/2005 | Dabrowski |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0078055 A1 | 4/2006 | Kanazawa |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0019930 A1 | 1/2007 | Kim |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1* | 8/2007 | McNeely ........... H04B 7/18523 713/153 |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2007/0299976 A1 | 12/2007 | Zafar et al. |
| 2007/0300250 A1 | 12/2007 | Smith et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1 | 3/2008 | Ida |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1 | 6/2008 | Tomizawa |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1* | 9/2008 | Pfeffer ............... H04N 7/17318 725/100 |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0158370 A1 | 6/2009 | Li et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1* | 8/2009 | Cholas ................ H04N 5/4401 725/82 |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1 | 6/2010 | Craner |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0272419 A1 | 10/2010 | Wang et al. |
| 2010/0284537 A1 | 11/2010 | Inbar |
| 2010/0293583 A1 | 11/2010 | Loebig et al. |
| 2010/0299528 A1* | 11/2010 | Le Floch ............. H04N 7/1675 713/179 |
| 2010/0306401 A1 | 12/2010 | Gilson |
| 2010/0313222 A1 | 12/2010 | Lee et al. |
| 2010/0319037 A1 | 12/2010 | Kim |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0008024 A1 | 1/2011 | Sasaki et al. |
| 2011/0043652 A1 | 2/2011 | King et al. |

(56) References Cited

U.S. PATENT DOCUMENTS

| | | |
|---|---|---|
| 2011/0078750 A1 | 3/2011 | Tam et al. |
| 2011/0080529 A1 | 4/2011 | Wong |
| 2011/0099364 A1 | 4/2011 | Robyr et al. |
| 2011/0106744 A1 | 5/2011 | Becker et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1 | 9/2011 | Kim |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1 | 8/2012 | Eppolito et al. |
| 2012/0198317 A1 | 8/2012 | Eppolito et al. |
| 2012/0198501 A1 | 8/2012 | Ruan et al. |
| 2012/0236933 A1 | 9/2012 | Saitoh |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0081098 A1 | 3/2013 | Klughart |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0115636 A1 | 4/2014 | Stuckman |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Potrebic |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0134926 A1 | 5/2016 | Casagrande et al. |
| 2016/0198215 A1 | 7/2016 | Hardy |
| 2016/0234543 A1 | 8/2016 | Templeman |
| 2016/0249089 A1 | 8/2016 | Minnick |
| 2016/0323632 A1 | 11/2016 | Martch et al. |

FOREIGN PATENT DOCUMENTS

| | | |
|---|---|---|
| CN | 1926793 A | 3/2007 |
| CN | 101174946 A | 5/2008 |
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 2/2002 |
| EP | 1372339 A2 | 12/2003 |
| EP | 1 447 983 A1 | 8/2004 |
| EP | 1 667 452 B1 | 7/2006 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 7408/CHENP/2014 A | 1/2016 |
| IN | 9493/CHEN/2013 A | 6/2016 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 8/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/081729 A1 | 7/2011 |
| WO | 2011/027236 A1 | 10/2011 |
| WO | 2012/003693 A1 | 1/2012 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

U.S. Appl. No. 14/154,887, filed Jan. 14, 2014 Notice of Allowance dated Jan. 21, 2016, 26 pages.
U.S. Appl. No. 13/288,002, filed Nov. 2, 2011 Final Rejection dated Jan. 13, 2016, 22 pages.
U.S. Appl. No. 13/292,047, filed Nov. 8, 2011 Notice of Allowance dated Jan. 29, 2016, 45 pages.
U.S. Appl. No. 14/589,090, Notice of Allowance dated Feb. 9, 2016, 47 pages.
U.S. Appl. No. 14/591,549, Non Final Office Action dated Dec. 31, 2015, 19 pages.

(56) References Cited

OTHER PUBLICATIONS

U.S. Appl. No. 14/338,114, filed Jul. 22, 2014 Notice of Allowance dated Feb. 3, 2016, all pages.
Second Office Action for CN 201280031434.7, dated Dec. 23, 2015, 6 pages.
First Office Action issued by State Intellectual Property Office (SIPO) for CN 201280028697.2, dated Dec. 16, 2015, 11 pages.
Notice of Allowance received for Mexican Patent Appln. MX/a/2013/014991, dated Dec. 9, 2015, 1 page.
Notice of Allowance dated Dec. 4, 2015 for Mexican Patent Application No. MX/a/2014/009723, 1 page.
International Search Report and Written Opinion of PCT/US2015/065934 dated Apr. 8, 2016, all pages.
International Search Report and Written Opinion of PCT/EP2015/073937 dated Apr. 15, 2016, all pages.
U.S. Appl. No. 14/757,606, filed Dec. 23, 2015, Non Final Rejection dated Mar. 24, 2016, 33 pages.
U.S. Appl. No. 13/801,968, filed Mar. 13, 2013 Notice of Allowance dated Apr. 7, 2016, 33 pages.
Notice of Allowance dated Jan. 15, 2016 for Mexican Patent Application No. MX/a/2014/009928, 1 page.
Notice of Allowance dated Dec. 16, 2015 for Mexican Patent Application No. MX/a/2014/009919, 1 page.
U.S. Appl. No. 13/786,915, filed Mar. 6, 2013, Final Rejection dated May 12, 2016, 27 pages.
U.S. Appl. No. 13/215,598, filed Aug 23, 2011 Notice of Allowance dated May 24, 2016, all pages.
U.S. Appl. No. 13/801,994, Final Office Action dated May 4, 2016, 37 pages.
U.S. Appl. No. 14/529,989, filed Oct. 31, 2014, Final Rejection dated May 6, 2016, 27 pages.
U.S. Appl. No. 14/043,617, filed Oct. 1, 2013 Final Office Action dated May 6, 2016, 56 pages.
Office Action for EP 13 192 169.4 dated Mar. 29, 2016, all pages.
U.S. Appl. No. 13/786,915, filed Mar. 6, 2013, Notice of Allowance dated Jul. 19, 2016, all pages.
U.S. Appl. No. 14/757,606, filed Dec. 23, 2015, Notice of Allowance dated Jul. 18, 2016, all pages.
U.S. Appl. No. 14/340,190, filed Jul. 24, 2014, Notice of Allowance dated Aug. 22, 2016, all pages.
U.S. Appl. No. 14/591,549, Final Office Action dated Jun. 30, 2016, all pages.
U.S. Appl. No. 14/591,549, Non Final Office Action dated Dec. 14, 2016, all pages.
U.S. Appl. No. 14/695,188 Non Final Office Action dated Dec. 30, 2016, all pages.
U.S. Appl. No. 14/043,617, filed Oct. 1, 2013, Non-Final Office Action dated Sep. 29, 2016, all pages.
U.S. Appl. No. 14/043,617, filed Oct. 1, 2013, Notice of Allowance dated Dec. 23, 2016, all pages.
U.S. Appl. No. 15/131,868, filed Apr. 18, 2016 Non-Final Office Action dated Jan. 13, 2017, all pages.
Notice of Publication for BR 11 2013 032035-4 dated Dec. 20, 2016, 1 page.
Notice of Publication for BR 11 2013 032380-9 dated Jan. 3, 2017, 1 page.
Notice of Publication for BR 11 2013 032377-9 dated Jan. 3, 2017, 1 page.
Office Action for European Application No. 12825147 dated Mar. 7, 2016, all pages.
First Office Action and Search Report for CN Appln No. 201380014409.2 dated Oct. 9, 2016, all pages.
Office Action dated Nov. 29, 2016 for EP 13 761 291.7, all pages.
Evans, Brent: "GeekTonic: Jan. 25, 2009-Feb. 1, 2009", Jan. 31, 2009, SP55322053, 26 pages. Retreived from the Internet: URL: http://www.geektonic.com/2009_01_25_archive.html [retrieved on Nov. 23, 2016].
First Office Action and Search Report from the State Intellectual Property Office (SIPO) for CN 201280031150.8, dated Aug. 3, 2016, 10 pages.
Decision to Grant from the State Intellectual Property Office (SIPO) for CN 201280031434.7, dated May 12, 2016, all pages.
Second Office Action issued by State Intellectual Property Office for CN 201280028697.2, dated Jul. 8, 2016, all pages.
First Office Action and Search Report for CN Appln No. 201280030476.9 dated Aug. 9, 2016, all pages.
Notice of Allowance dated Jul. 21, 2016 for Mexican Patent Application No. MX/a/2015/10334, 1 page.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Author Unknown, "Digital Video Broadcasting (DVB); Specification for Service Information (SI) in DVB systems," ETSI EN 300 468 V1.1 (Jan. 2013), 172 pages.
Author Unknown, Digital Video Broadcasting (DVB); Content Protection and Copy Management (DVB-CPCM); Part 3: CPCM Usage State Information; European Broadcasting Union Union Europa de Radio-Television, ETSI TS 102 825-3 V1.1.1 (Jul. 2008), XP014042034, 28 pages.
Hee-Yong Kim et al., "DCT Domain Filter for ATV Down Conversion", Consumer Electronics, 1997. Digest of Technical Papers. ICCE., International Conference ON, IEEE, Jun. 11, 1997, pp. 142-143, XP032381904, DOI: 10.1109/ICCE. 1997.625904, ISBN: 978-0-7803-3734-3.
U.S. Appl. No. 14/944,758, Non-Final Office Action dated Jan. 25, 2017, all pages.
U.S. Appl. No. 15/141,304, Non-Final Office Action dated Feb. 28, 2017, all pages.
Notice of Publication for BR 11 2013 032860-6 dated Jan. 24, 2017, 1 page.
Office Action for European Application No. 12825147 dated Aug. 23, 2016, all pages.
Publication of Brazil appln No. BR 11 2013 031100-2 on Jun. 6, 2017, 1 page.
Notice of Publication for BR 11 2014 020064-5 A2 dated Jun. 20, 2017, 1 page.
U.S. Appl. No. 15/143,999, filed May 2, 2016, Non-Final Rejection dated Apr. 20, 2017, all pages.
U.S. Appl. No. 15/131,868, filed Apr. 18, 2016 Notice of Allowance dated Jun. 16, 2017, all pages.
Second Office Action for CN Appln No. 201380014409.2 dated Jun. 7, 2017, all pages.
Second Office Action from the State Intellectual Property Office (SIPO) for CN 201280031150.8, dated Mar. 27, 2017, all pages.
International Search Report and Written Opinion of PCT/US2012/51992 dated Nov. 2, 2012, 15 pages.
International Search Report and Written Opinion of PCT/US2012/51987 dated Oct. 23, 2012, 20 pages.
International Search Report and Written Opinion of PCT/US2012/051984 dated Nov. 5, 2012, 13 pages.
International Search Report and Written Opinion of PCT/US2012/52002 dated Oct. 16, 2012, 17 pages.
International Search Report and Written Opinion of PCT/US2013/031432 dated May 28, 2013, 10 pages.
International Preliminary Report on Patentability for PCT/US2013/031432 dated Sep. 16, 2014, 9 pages.
International Search Report and Written Opinion of PCT/US2013/031445 dated May 24, 2013, 11 pages.
International Preliminary Report on Patentability for PCT/US2013/031445 dated Sep. 16, 2014, 10 pages.
International Preliminary Report on Patentability for PCT/US2012/052002 dated Apr. 17, 2014, 10 pages.
International Search Report and Written Opinion of PCT/US2012/51964 dated Nov. 2, 2012, 13 pages.
International Search Report and Written Opinion of PCT/US2012/052011 dated Dec. 17, 2012, 44 pages.
International Preliminary Report on Patentability, PCT/US2012/052011, dated Mar. 6, 2014, 6 pages.
International Preliminary Report on Patentability, PCT/US2012/051984, dated Mar. 6, 2014, 8 pages.
International Preliminary Report on Patentability, PCT/US2012/051964, dated Apr. 10, 2014, 7 pages.

(56) References Cited

OTHER PUBLICATIONS

International Preliminary Report on Patentability, PCT/US2012/051992, dated Apr. 3, 2014, 7 pages.
International Preliminary Report on Patentability, PCT/US2012/051987, dated Mar. 6, 2014, 7 pages.
International Search Report of PCT/KR2007/003521 dated Oct. 23, 2007, 22 pages.
International Search Report of PCT/IB2003/005737 dated Mar. 2, 2004, 21 pages.
International Preliminary Report on Patentability for PCT/US2013/032176 dated Sep. 25, 2014, 7 pages.
International Search Report and Written Opinion of PCT/US2013/32176 dated Jun. 25, 2013, 15 pages.
International Search Report and Written Opinion of PCT/US2013/031565 dated May 31, 2013, 82 pages.
International Preliminary Report on Patentability for PCT/US2013/031565 dated Sep. 16, 2014, 18 pages.
International Preliminary Report on Patentability for PCT/US2013/031915 dated Sep. 16, 2014, 5 pages.
International Search Report and Written Opinion of PCT/US2013/031915 dated Jun. 3, 2013, 7 pages.
International Search Report and Written Opinion of PCT/US2013/031440 dated May 30, 2013, 14 pages.
European Search Report for EP 12825653 dated Mar. 11, 2015, 7 pages.
Extended European Search Report for EP 12825080 dated Sep. 11, 2014, 10 pages.
Extended European Search Report for EP 12825521 dated Nov. 24, 2014, 7 pages.
Extended European Search Report for EP 12825474 dated Jan. 7, 2015, 6 pages.
Extended European Search Report for EP 12825430 dated Feb. 3, 2015, 9 pages.
Supplementary European Search Report for Application No. EP 12825147 dated Mar. 27, 2015, 9 pages.
Supplementary European Search Report for EP 13761291.7 dated Jul. 9, 2015, 8 pages.
Supplementary European Search Report for EP 13760902 dated Oct. 20, 2015, all pages.
Supplementary European Search Report for EP 13761427 dated Oct. 19, 2015, all pages.
Extended European Search Report for EP 13760237.1 dated Jul. 21, 2015, 8 pages.
International Preliminary Report on Patentability for PCT/US2013/031440 dated Sep. 25, 2014, 8 pages.
First Office Action and Search Report from the State Intellectual Property Office (SIPO) for CN 201280031434.7, dated Jul. 17, 2015, 12 pages.
Office Action dated Jul. 31, 2015 for Mexican Patent Application No. MX/a/2014/009919, 2 pages.
The Notice of Allowance by the Mexican Institute of Industrial Property for Mexican Patent Application No. MX/a/2013/014677 dated Mar. 19, 2015 is not translated into English, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
Office Action dated Jul. 31, 2015 for Mexican Patent Application No. MX/a/2014/009928, 2 pages.
The Notice of Allowance by the Mexican Institute of Industrial Property for Mexican Patent Application No. MX/a/2013/014671 dated Apr. 17, 2015, 1 page.
The Office Action dated Nov. 6, 2014 for Mexican Patent Application No. MX/a/2013/014677 is not translated into English, 2 pages.
The second Office Action dated Feb. 26, 2015 for Mexican Pat. Appln. No. MX/a/2013/014217 is not translated into English, 3 pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
The Notice of Allowance by the Mexican Institute of Industrial Property for Mexican Patent Application No. MX/a/2013/014907 dated Feb. 20, 2015 is not translated into English, 1 page.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; in proceeding of: Proceedings of the 14th ACM International Conference on Multimedia, Santa Barbara, CA, USA, Oct. 23-27, 2006, 4 pages.
Jensen, Craig, "Fragmentation: the condition, the cause, the cure" Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014, 70 pages.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
U.S. Appl. No. 13/786,915, filed Mar. 6, 2013, Non Final Rejection dated Oct. 15, 2015, 59 pages.
U.S. Appl. No. 14/340,190, filed Jul. 24, 2014, Non-Final Rejection dated Aug. 31, 2015, 74 pages.
U.S. Appl. No. 14/154,887, filed Jan. 14, 2014 Non-Final Rejection dated Jul. 17, 2015, 33 pages.
U.S. Appl. No. 14/467,959, filed Aug. 25, 2014 Notice of Allowance dated Jun. 22, 2015, 36 pages.
U.S. Appl. No. 13/888,012, filed May 6, 2013 Non-Final Rejection dated Apr. 6, 2015, 36 pages.
U.S. Appl. No. 13/888,012, filed May 6, 2013 Notice of Allowance dated Jul. 14, 2015, 18 pages.
U.S. Appl. No. 13/856,752, filed Apr. 4, 2013 Non Final Office Action dated Nov. 5, 2014, 34 pages.
U.S. Appl. No. 13/856,752, filed Apr. 4, 2013 Notice of Allowance dated Feb. 10, 2015, 20 pages.
U.S. Appl. No. 13/757,168, filed Feb. 1, 2013 Notice of Allowance dated Oct. 14, 2014, 28 pages.
U.S. Appl. No. 13/757,168, filed Feb. 1, 2013, Non Final Office Action dated Jun. 4, 2014, 23 pages.
U.S. Appl. No. 13/799,604, filed Mar. 13, 2013, Notice of Allowance dated Jul. 24, 2015, 34 pages.
U.S. Appl. No. 13/799,604, filed Mar. 13, 2013, Notice of Allowance dated May 29, 2015, 46 pages.
U.S. Appl. No. 13/799,604, filed Mar. 13, 2013, Final Office Action dated Jan. 14, 2015, 36 pages.
U.S. Appl. No. 13/799,604, filed Mar. 13, 2013, Non Final Office Action dated Jun. 6, 2014, 24 pages.
U.S. Appl. No. 13/149,852, filed May 31, 2011, Non-Final Office Action dated Dec. 12, 2012, 9 pages.
U.S. Appl. No. 13/149,852, filed May 31, 2011, Final Office Action dated Mar. 26, 2013, 13 pages.
U.S. Appl. No. 13/149,852, filed May 31, 2011, Notice of Allowance dated Jul. 11, 2013, 13 pages.
U.S. Appl. No. 13/286,157, filed Oct. 31, 2011, Non-Final Office Action dated Jan. 17, 2013, 20 pages.
U.S. Appl. No. 13/286,157, filed Oct. 31, 2011, Non-Final Office Action dated Jul. 25, 2013, 49 pages.

(56) References Cited

OTHER PUBLICATIONS

U.S. Appl. No. 13/286,157, filed Oct. 31, 2011, Notice of Allowance dated Feb. 3, 2014, 81 pages.
U.S. Appl. No. 13/215,702, filed Aug. 23, 2011, Notice of Allowance dated Feb. 11, 2013, 13 pages.
U.S. Appl. No. 13/288,002, filed Nov. 2, 2011, Non-final Office Action dated Sep. 26, 2013, 15 pages.
U.S. Appl. No. 13/288,002, filed Nov. 2, 2011, Final Office Action dated Mar. 27, 2014, 20 pages.
U.S. Appl. No. 13/288,002, filed Nov. 2, 2011 Non Final Rejection dated Jul. 28, 2015, 29 pages.
U.S. Appl. No. 13/302,852, filed Nov. 22, 2011 Non-Final Rejection dated May 23, 2013, 19 pages.
U.S. Appl. No. 13/302,852, filed Nov. 22, 2011, Notice of Allowance dated Jun. 19, 2015, 26 pages.
U.S. Appl. No. 13/302,852, filed Nov. 22, 2011, Final Rejection dated Dec. 9, 2013, 23 pages.
U.S. Appl. No. 13/302,852, filed Nov. 22, 2011, Non-Final Rejection dated Sep. 2, 2014, 28 pages.
U.S. Appl. No. 13/302,852, filed Nov. 22, 2011, Final Rejection dated Mar. 30, 2015, 29 pages.
U.S. Appl. No. 13/324,831, filed Dec. 13, 2011, Non-Final Office Action dated Feb. 28, 2013, 23 pages.
U.S. Appl. No. 13/324,831, filed Dec. 13, 2011, Notice of Allowance dated Sep. 4, 2013, 22 pages.
U.S. Appl. No. 13/292,047, filed Nov. 8, 2011, Non-Final Office Action dated Jan. 18, 2013, 17 pages.
U.S. Appl. No. 13/292,047, filed Nov. 8, 2011, Final Office Action dated Aug. 19, 2013, 17 pages.
U.S. Appl. No. 13/292,047, filed Nov. 8, 2011 Final Office Action dated Jan. 13, 2015, 22 pages.
U.S. Appl. No. 13/292,047, filed Nov. 8, 2011 Non-Final Office Action dated Jul. 7, 2015, 28 pages.
U.S. Appl. No. 13/614,899, filed Sep. 13, 2012, Non-Final Office Action dated Feb. 5, 2013, 17 pages.
U.S. Appl. No. 13/614,899, filed Sep. 13, 2012, Non-Final Office Action dated May 20, 2014, 25 pages.
U.S. Appl. No. 13/614,899, filed Sep. 13, 2012, Non-Final Office Action dated Sep. 17, 2013, 17 pages.
U.S. Appl. No. 13/614,899, filed Sep. 13, 2012, Final Office Action dated Mar. 17, 2014, 41 pages.
U.S. Appl. No. 13/614,899, filed Sep. 13, 2012, Notice of Allowance dated Mar. 13, 2015, 35 pages.
U.S. Appl. No. 13/291,014, filed Nov. 7, 2011, Non-Final Office Action dated Mar. 29, 2013, 21 pages.
U.S. Appl. No. 13/291,014, filed Nov. 7, 2011, Notice of Allowance dated Aug. 7, 2013, 16 pages.
U.S. Appl. No. 13/215,598, filed Aug. 23, 2011, Non-Final Office Action dated Jun. 20, 2013, 15 pages.
U.S. Appl. No. 13/215,598, filed Aug. 23, 2011, Final Office Action dated Nov. 21, 2013, 23 pages.
U.S. Appl. No. 13/215,598, filed Aug. 23, 2011, Non-Final Office Action dated Feb. 6, 2014, 12 pages.
U.S. Appl. No. 13/215,598, filed Aug. 23, 2011 Non-Final Office Action dated Nov. 25, 2014, 18 pages.
U.S. Appl. No. 13/215,598, filed Aug 23, 2011 Final Office Action dated Jul. 2, 2014, 22 pages.
U.S. Appl. No. 13/215,598, filed Aug 23, 2011 Final Office Action dated May 5, 2015, 17 pages.
U.S. Appl. No. 13/215,598, filed Aug 23, 2011 Non Final Office Action dated Dec. 15, 2015, all pages.
U.S. Appl. No. 13/215,655, filed Aug. 23, 2011, Non-Final Office Action dated Sep. 6, 2013, 27 pages.
U.S. Appl. No. 13/215,655, filed Aug 23, 2011, Final Office Action dated Dec. 18, 2013, 20 pages.
U.S. Appl. No. 13/215,916, filed Aug. 23, 2011, Notice of Allowance dated Jan. 4, 2013, 10 pages.
U.S. Appl. No. 13/294,005, filed Nov. 11, 2011 Notice of Allowance dated Oct. 31, 2014, 24 pages.
U.S. Appl. No. 13/294,005, filed Nov. 11, 2011 Non-Final Office Action dated May 20, 2014, 33 pages.
U.S. Appl. No. 13/294,005, filed Nov. 11, 2011, Non-Final Office Action dated Aug. 14, 2013, 32 pages.
U.S. Appl. No. 13/294,005, filed Nov. 11, 2011, Final Office Action dated Jan. 3, 2014, 29 pages.
U.S. Appl. No. 13/592,976, filed Aug. 23, 2012, Notice of Allowance dated Oct. 7, 2013, 18 pages.
U.S. Appl. No. 13/797,173, filed Mar. 12, 2013 Notice of Allowance dated Nov. 24, 2014, 37 pages.
U.S. Appl. No. 13/797,173, filed Mar. 12, 2013 Notice of Allowance dated Feb. 26, 2015, 19 pages.
U.S. Appl. No. 13/797,173, filed Mar. 12, 2013, Non Final Office Action dated May 15, 2014, 28 pages.
U.S. Appl. No. 13/799,653, filed Mar. 13, 2013 Notice of Allowance dated Nov. 26, 2014, 32 pages.
U.S. Appl. No. 13/799,653, filed Mar. 13, 2013, Non Final Office Action dated May 8, 2014, 24 pages.
U.S. Appl. No. 13/801,968, filed Mar. 13, 2013 Non Final Office Action dated May 21, 2015, 49 pages.
U.S. Appl. No. 13/801,968, filed Mar. 13, 2013 Final Office Action dated Nov. 19, 2015, all pages.
U.S. Appl. No. 13/829,350, filed Mar. 14, 2013, Non Final Office Action dated Feb. 28, 2014, 29 pages.
U.S. Appl. No. 13/829,350, filed Mar. 14, 2013 Non Final Office Action dated Jul. 29, 2014, 24 pages.
U.S. Appl. No. 13/829,350, filed Mar. 14, 2013 Final Office Action dated Jan. 23, 2015, 18 pages.
U.S. Appl. No. 13/829,350, filed Mar. 14, 2013 Notice of Allowance dated Jul. 24, 2015, 29 pages.
U.S. Appl. No. 13/828,001, filed Mar. 14, 2013, Notice of Allowance dated Apr. 25, 2014, 43 pages.
U.S. Appl. No. 13/799,719, filed Mar. 13, 2013, Non Final Office Action dated Oct. 25, 2013, 79 pages.
U.S. Appl. No. 13/799,719, filed Mar. 13, 2013, Notice of Allowance dated Apr. 23, 2014, 141 pages.
U.S. Appl. No. 13/801,994, Non Final Office Action dated Oct. 7, 2015, 55 pages.
U.S. Appl. No. 14/064,423, filed Oct. 28, 2013, Non-Final Office Action dated Dec. 20, 2013, 18 pages.
U.S. Appl. No. 14/064,423, filed Oct. 28, 2013, Notice of Allowance dated Mar. 4, 2013, 37 pages.
U.S. Appl. No. 14/060,388, filed Oct. 22, 2013, Notice of Allowance dated Apr. 13, 2015, 44 pages.
U.S. Appl. No. 13/793,636, filed Mar. 11, 2013, Non-Final Office Action dated Sep. 29, 2014, 27 pages.
U.S. Appl. No. 13/793,636, filed Mar. 11, 2013, Notice of Allowance dated Jan. 28, 2015, 43 pages.
U.S. Appl. No. 14/095,860, filed Dec. 3, 2013 Non-Final Office Action dated Dec. 26, 2014, 45 pages.
U.S. Appl. No. 14/095,860, filed Dec. 3, 2013 Final Office Action dated May 1, 2015, 18 pages.
U.S. Appl. No. 14/095,860, filed Dec. 3, 2013 Notice of Allowance dated Jul. 13, 2015, 31 pages.
U.S. Appl. No. 14/095,860, filed Dec. 3, 2013 Notice of Allowance dated Oct. 19, 2015, 14 pages.
U.S. Appl. No. 14/338,114, filed Jul. 22, 2014 Non-Final Office Action dated Sep. 30, 2015, all pages.
U.S. Appl. No. 14/529,989, filed Oct. 31, 2014 Non-Final Office Action dated Nov. 4, 2015, all pages.
U.S. Appl. No. 13/795,914, filed Mar. 6, 2013 Notice of Allowance dated Jul. 21, 2014, 13 pages.
U.S. Appl. No. 13/795,914, filed Mar. 6, 2013 Final Office Action dated Apr. 3, 2014, 17 pages.
U.S. Appl. No. 13/795,914, filed Mar. 6, 2013, Non-Final Office Action dated Oct. 11, 2013, 17 pages.
U.S. Appl. No. 13/800,477, filed Mar. 13, 2013 Non-Final Office Action dated Sep. 11, 2014, 34 pages.
U.S. Appl. No. 13/800,477, filed Mar. 13, 2013 Notice of Allowance dated Feb. 18, 2015, 18 pages.
U.S. Appl. No. 14/043,617, filed Oct. 1, 2013 Non-Final Office Action dated Jan. 5, 2015, 45 pages.

(56) References Cited

OTHER PUBLICATIONS

U.S. Appl. No. 14/043,617, filed Oct. 1, 2013 Final Office Action dated Jul. 16, 2015, 45 pages.
U.S. Appl. No. 14/043,617, filed Oct. 1, 2013 Non-Final Office Action dated Oct. 23, 2015, all pages.
U.S. Appl. No. 14/676,137, filed Apr. 1, 2015 Notice of Allowance dated Sep. 28, 2015, 35 pages.
Anonymous: "Documentation: Playback—VideoLAN Wiki", Dec. 25, 2010, XP055388595, Retrieved from the Internet: URL:https://wiki.videolan.org/index.php?Title=Documentation: Playback&oldid=18460 [retrieved on Jul. 6, 2017], 3 pages.
Anonymous: "How to Watch DVB-T With VLC Media Player", Jan. 25, 2009, XP055388602, Retrieved from the Internet: URL: http://www.izitips.com/software/how-to-watch-dvb-t-with-vlc-media-player/ [retrieved on Jul. 6, 2017], 3 pages.
Anonymous: "News—VideoLAN", Jul. 15, 2011, XP055388604, Retreived from the Internet: URL: http://www.videolan.org/news.html#news-2011-07-15 [retrieved on Jul. 6, 2017], 69 pages.
Office Action dated Jul. 18, 2017 for EP 12825147.7, 7 pages.
U.S. Appl. No. 15/143,999, filed May 2, 2016, Notice of Allowance dated Aug. 25, 2017, all pages.
U.S. Appl. No. 14/695,188 Final Office Action dated Jul. 28, 2017, all pages.
Office Action for EP 128254745 dated Aug. 4, 2017, all pages.
Wikipedia: "MPEG-2 Transmission", Internet Citation, Jan. 31, 2001, pp. 1-9, XP002715999, Retrieved from the Internet: URL: http://www.erg.abdn.ac.uk/future-net/digital-video/mpeg2-trans.html [retrieved on Nov. 7, 2013].
International Prelminary Report on Patentability for PCT/US2015/065934 dated Jul. 11, 2017, all pages.
U.S. Appl. No. 15/143,999, filed May 2. 2016, Notice of Allowance dated Aug. 25, 2017, all pages.
Anonymous: "The Angry Technician's Guide to streaming Freeview via VLC, you Idiots / The Angry Technician", Jun. 24, 2010, XP055388589, Retrieved from the Internet: URL: https://angrytechnician.wordpress.com/2010/06/24/the-angry-technicians-guide-to-streaming-freeview-via-vlc-you-idiots/ [retrieved on Jul. 6, 2017], 14 pages.

\* cited by examiner

STORING MULTIPLE INSTANCES OF CONTENT

CROSS REFERENCE TO RELATED APPLICATION

This application is a continuation of U.S. patent application Ser. No. 13/302,852, filed Nov. 22, 2011, which claims the benefit of U.S. Provisional Application No. 61/526,665, filed Aug. 23, 2011. Each of these applications are hereby incorporated by reference for all purposes.

FIELD OF THE INVENTION

This disclosure relates generally to utilizing content receivers to view multiple instances of content, often recorded simultaneously.

SUMMARY

The present disclosure discloses systems and methods for storing multiple instances of content utilizing a content receiver. One embodiment takes the form of a method for recording multiple instances of content, comprising: receiving, at a content receiver, an instruction to initiate recording; in response to the instruction, setting a first tuner to a first carrier frequency; further in response to the instruction, setting a second tuner to a second carrier frequency; receiving a first set of content at the first tuner, the first set of content encrypted with a control word; receiving a second set of content at the second tuner, the second set of content encrypted with the control word; and recording the first and second sets of content on a storage medium.

Another embodiment may take the form of an apparatus for receiving multiple instances of content, comprising: a first communications unit operative to receive a first set of instances of content transmitted on a first transponder; a second communications unit operative to receive a second set of instances of content transmitted on a second transponder; a processing unit operatively connected to the first and second communications unit, the processing unit operative to control the first and second communications unit; a descrambler operative to descramble the first and second instances of content; and a data storage unit operative to receive and store the first and second instances of content.

Still another embodiment may take the form of a method for decrypting content, comprising: receiving a first set of encrypted content modulated with a first carrier frequency; substantially simultaneously, receiving a second set of encrypted content modulated with a second carrier frequency; and decrypting both the first and second sets of encrypted content with a common control word, thereby producing a first and second set of decrypted content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Users of content receivers may desire to access different instances of content that are broadcast simultaneously and/or substantially contemporaneously by content providers. For example, many television programming viewers wish to watch different television programs that occupy the same broadcast time slot, such as the different television programs associated with the major television programs that are broadcast between seven PM and ten PM mountain time. Content receivers may attempt to address this issue by utilizing multiple tuners that can each separately present and/or record different, simultaneously broadcast instances of content. However, a separate tuner may still be required for each simultaneous or substantially contemporaneous instance of broadcast or otherwise received content that a content receiver user wishes to view and/or record. Further, in addition to separate tuners required for each instance of content, the content receiver may require sufficient resources to descramble, demodulate and store each of the instances of content desired by the user.

Figure 1:
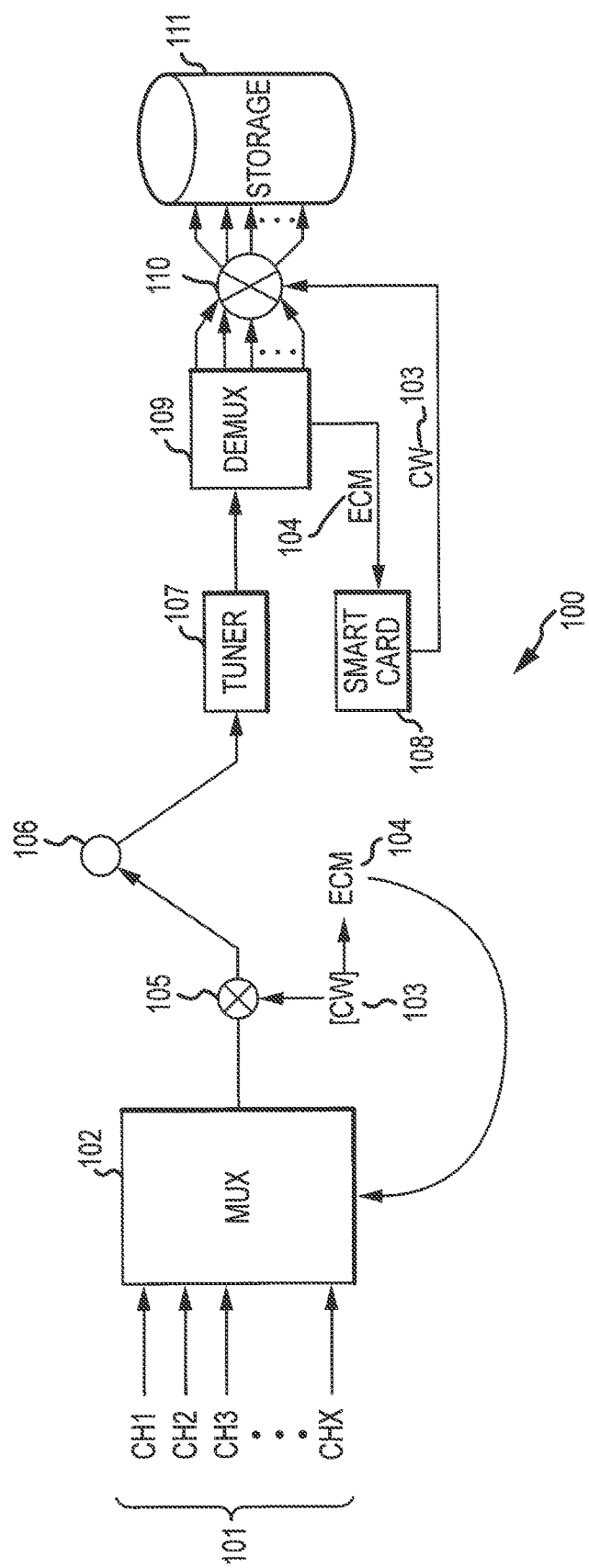
FIG. 1 is a block diagram illustrating a system for automatically recording multiple instances of content from one or more programming providers.

FIG. 1 is a block diagram illustrating a system 100 for automatically recording multiple instances of content from one or more programming providers. The automatic recording of multiple instances of content provided by the system 100 may enable users of content receivers to access different instances of content that are broadcast simultaneously and/or substantially contemporaneously by content providers. "Multiple instances of content" may be, for example, different programs, movies, program episodes, and so on. Thus, multiple instances of content may be different episodes of a program, or different programs. It should be appreciated that the multiple instances of content may be recorded simultaneously by the embodiments described herein.

Further, it should be appreciated that a first group of multiple instances of content may occupy a first time slot, while a second group of multiple instances of content may occupy a second time slot. Embodiments described herein may record the first group at the first time and the second group at the second time.

In various broadcast systems, content providers may broadcast content to a plurality of different content receivers via one or more frequency bands utilizing one or more satellites. Each multiplexed signal contained in the frequency band (sometimes referred to as a transponder) may be configured to include data related to one or more instances of content, such as one or more television programming channels. The data related to each of the instances of content included in each frequency may be scrambled utilizing one or more CWs (control words), which may then be encrypted to generate one or more ECMs (entitlement control messages) which may in turn be included with the data. A content receiver may typically tune to one or more of the frequency bands to receive the multiplexed signal that contains data for a particular programming channel, or group of channels, utilizing one or more tuners. The content receiver may process only a subset of the programming channels by keeping the data associated with the particular programming channel and discarding data received via the tuned frequency band and multiplexed signal associated with other programming channels. The content receiver may decrypt the ECM included with the data associated with the particular programming channel to obtain the CW, descramble the data utilizing the CW, and store and/or transmit the data (e.g., decompressed, reconstructed audio and video data) to one or more presentation devices.

As illustrated in FIG. 1, in this implementation, one or more content providers may select multiple instances of content 101 to be automatically recorded such as by utilizing predefined recording parameters. For example, a content provider may select all of the television events defined as "primetime events" associated with all channels defined as "primetime television channels" for a particular period of time defined as "prime time" to be automatically recorded. In other examples, the content provider may select television events associated with programming channels for a particular time period (such as a half hour, multiple hours, and/or an entire programming day) in response to user selections. After the content provider selects the multiple instances of content, the multiple instances of content may be multiplexed utilizing a multiplexer 102. The multiplexed signal (which includes the multiplexed selected multiple instances of content) may then be scrambled by a scrambler 105 utilizing one or more CWs 103. The CW may be encrypted to generate an ECM, which may be included with the multiplexed signal. The scrambled multiplexed signal may then be included in a broadcast on a frequency band (e.g., cable, satellite), which may then be transmitted to one or more satellites 106 for broadcast. The satellite 106 may receive the frequency band (uplink frequency band) and then broadcast the multiplexed signal to a number of content receivers on a translated frequency band (downlink frequency band), such as a content receiver that includes a tuner 107.

The tuner 107 may tune to the frequency band that includes the multiple instances of content (which may be performed in response to one or more recording instructions received by the content receiver that includes the tuner from the content provider). The data received via the tuned frequency may be demultiplexed by a demultiplexer 109 and then descrambled by a descrambler 110 (e.g., decoder) utilizing the CW before being stored in a non-transitory storage medium 111 (which may take the form of, but is not limited to: a magnetic storage medium; optical storage medium; magneto-optical storage medium; random access memory; erasable programmable memory; flash memory; and so on) based on recording parameters, such as predefined recording parameters. The demultiplexer 109 may obtain the included ECM 104, and the ECM may be provided to a smart card 108 that may decrypt the ECM 104 to obtain the CW 103 for the descrambler 110. Hence, the multiple instances of content may subsequently all be available to a user of the content receiver (until such time as they are removed from the non-transitory storage medium) without requiring multiple tuners to receive each of the multiple instances of content, without requiring the smart card to decrypt multiple ECMs. In some implementations, the multiple instances of content may be stored in a single file. It should be appreciated that the tuner 107, smart card 108, demultiplexer 109, descrambler 110 and/or storage medium 111 may all be resident in a single enclosure or other housing. One example of a device that may incorporate such elements is the content receiver 202, discussed below with respect to FIG. 2.

Although the system 100 is illustrated in FIG. 1 and is described above as including a number of specific components configured in a specific arrangement, it is understood that this is for the purposes of example and other arrangements involving fewer and/or additional components are possible without departing from the scope of the present disclosure. For example, in various implementations, the multiple instances of content may be individually scrambled utilizing the code word prior to multiplexing. In another example, in some implementations, the data received via the tuned frequency may be demultiplexed before being individually descrambled utilizing the code word.

In some implementations of the system of FIG. 1, multiple instances of content may be recorded simultaneously from a single transponder and stored in the non-transitory storage medium 111 of the content receiver as a single the of multiple recorded instances of content. Upon playing of one instance of content from the single the of the multiple recorded instances of content, the content receiver may read the file incrementally so as to play the one instance of content while filtering out the other the contents (e.g., the other instance of content within the the). For example, five instances of content may be received at a transponder and simultaneously recorded by the content receiver based on predefined recording parameters, and each of the instances of content may record at an average variable bit rate. More specifically, one instance of content may be received by the transponder and be recorded by the content receiver at an average of 1 Mb/sec (Megabits per second), a second instance of content at an average of 2 Mb/sec, a third at 3 Mb/sec, a fourth instance of content at an average of 4 Mb/sec, and a fifth instance of content at 5 Mb/sec. In this example, the transponder receives and the content receiver records the five instances of content at an aggregate bit rate of 15 Mb/sec (e.g., the aggregate of 1 Mb/sec, 2 Mb/sec, 3 Mb/sec, 4 Mb/sec, and 5 Mb/sec). Thus, playing one of the five instances of content involves utilizing the content receiver to read the full file at 15 Mb/sec but discarding all but the one instance of content that is desired. In alternative embodiments, each instance of content being simultaneously recorded may be written as a separate file in the storage medium 111.

In some implementations, the aggregate recording bit rate may be less than the maximum available recording bit rate. Thus, the aggregate bit rate of 15 Mb/sec for a transponder may be less than the maximum available bit rate of, for example, up to 40 Mb/sec. Accordingly, playing an instance of recorded content involves the content receiver determining the aggregate recording bit rate for the file of the simultaneously recorded multiple instances of content and playing the instance of content based on the aggregate recording bit rate.

In another example, a file of ten simultaneously recorded instances of content may be recorded at a bit rate of 40 Mb/sec (e.g., a maximum aggregate bit rate for the transponder), having a recording bit rate (or an average bit rate) of 4 Mb/sec playing one of the ten instances of content involves utilizing the content receiver to incrementally read the file in increments of 4 Mb/sec of the total 40 Mb/sec recorded. A first show may be associated with the content recorded at the first 4 Mb/sec (e.g., Mb 1-4) of the total 40 Mb/sec, a second show may be associated with the content recorded at the second 4 Mb/sec (e.g., Mb 5-8), and so on.

In the examples above, it will be appreciated that the multiple instances of content may be recorded based on statistical multiplexing utilizing communicatively coupled video compressors that determine the bandwidth of data needed for compressing the instance of content to be recorded. This enables the recording (and replay) bit rate of an instance of content to be variable within the recording stream, and accordingly the multiple instances of content may be recorded each at varying titrates. For a given transponder, as the percentage of the transport stream that is being recorded increases, the variability of the recording data drops. That is, if 100 percent of the stream is being recorded (e.g. at the maximum aggregate bit rate for the transponder), then the variability is zero. As a result, the average recording bit rate of many varying streams may be less noisy. In the examples above, it will also be appreciated that the aggregate recording bit rate may be calculated periodically or in real time.

Figure 2:
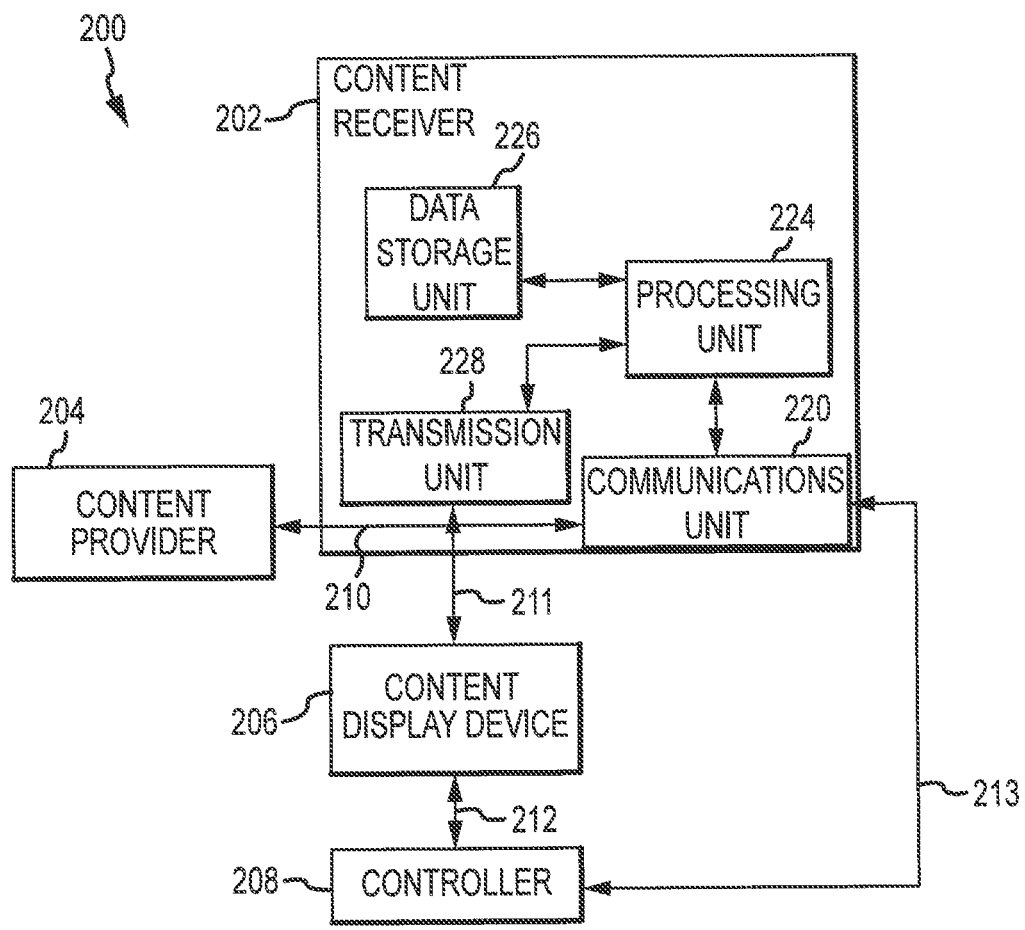
FIG. 2 is a block diagram illustrating a system for storing multiple instances of content.

FIG. 2 is a block diagram illustrating a system 200, potentially including a content provider 204 and a content receiver 202. The system 200 may be at least partly incorporated into the system of FIG. 1. The content receiver 202 (such as a set top box) may receive and, in some instances, transmit content (such as television programming and on screen display content) to other receivers to a remote viewer, and the like. The content provider 204 generally is as a satellite or cable programming service provider and transmits content to the receiver across a network, one example of which is the satellite(s) 106 shown in FIG. 1. Alternate networks may include a wired network, such as a cable network, a wireless network, such as a terrestrial broadcast network, the Internet, an Ethernet or other local network, combinations of any of the foregoing, and the like. It should be appreciated that the content receiver 202 may incorporate various elements of FIG. 1, such as the tuner 107, demultiplexer 109, smart card 108, multiplexer 110 and/or storage 111. Such elements may not be shown specifically in FIG. 2, insofar as they were discussed with respect to FIG. 1. These elements may be controlled, for example, by the processing unit 224 of FIG. 2. Likewise, the data storage unit 226 may be the same as the storage device 111 of FIG. 1.

The system may also include, or be coupled to, a content display device 206 for receiving and displaying the content (such as a television), and a controller 208 (such as a remote control) for transmitting data such as control signals to the content receiver 202.

The content receiver 202 generally receives content from the content provider 204 and, optionally, from other external sources such as other content receivers and servers accessed across a network. The content receiver 202 may process and/or decode the content, as well as transmit the content to the content display device 206. The content receiver 202 may be, for example, a set top box, a television receiver, a digital video recorder, a computing device, a gaming device, or a television, which is generally located at a user's location (such as a user's residence or business). The content receiver 202 is operable to receive content from the content provider 204 (and/or another external source) by way of the transmission link 210. Such content is received by the communications unit 220 of the content receiver 202; the communications unit 220 may be analogous to or include one or more of the tuner 107, demultiplexer 109, descrambler 110 and/or smart card 108. The processing unit 224 may execute instructions for causing the data storage unit 226 (such as the non-transitory storage medium 111) to record multiple instances of content for a plurality of programming channels simultaneously within a single file described above in connection with FIG. 1, and/or to play one of the stored instances of content. The transmission unit 228 may be communicatively coupled to the content display device 206 by way of transmission link 211.

The content provider 204 (such as a satellite programming company, a cable company, an Internet service provider, e.g., an online video service or Internet video provider, and the like) is generally remotely located from the content receiver 202. The content provider transmits content to the communications unit 220 of the content receiver 202 via the transmission link 210. The content transmitted may include metadata specifying recording instructions for the content receiver 202 to automatically record multiple instances of content simultaneously for multiple programming channels as described elsewhere herein.

The content display device 206 is generally communicatively coupled to the content receiver 202 and displays content transmitted by the content receiver 202. While the content display device 206 and the content receiver 202 are depicted as separate components in FIG. 2, the content receiver 202 may be incorporated with the content display device 206. The content display device 206 is, for example, a television, a computer screen, a video screen, or any other display device for displaying content. The content display device 206 is communicatively coupled to the content receiver 202 by way of the transmission link 211.

The controller 208 is generally provided in an area proximate the content receiver 202 and is communicatively coupled to the content display device 206 by way of the transmission link 212, and to the content receiver 202 by way of the transmission link 213. The controller 208 is, for example, a remote control, such as a universal remote control, a dedicated remote control, or a computing device programmed to send command signals (such as selection signals) to the content receiver 202. The controller 208 may be utilized to provide command signals instructing the content receiver 202 to record and/or reply one or more instances of content.

Returning to the content receiver 202, the processing unit 224 may be programmed to manage, initiate or otherwise facilitate recording and/or playback of one (or more) instances of content received from a number of programming channels carried on a single transponder. For example, four programming channels and the corresponding four instances of content may be recorded simultaneously and stored in the data storage unit 226. Upon receipt of the appropriate command or commands, which may be transmitted from the controller 208, the processing unit 224 may retrieve data from the data storage unit 226 and format it for display on the content display device 206. It should be appreciated that such formatting and display may involve demodulating, decrypting, and/or other operations executed by one or more hardware, software and/or firmware elements (not necessarily shown) generally controlled by the processing unit 224. Accordingly, actions ascribed to the processing unit may be carried out by other portions of the content receiver 202 at the processing unit's direction.

Recording and playing back one or more of the multiple instances of content may involve the processing unit 224 reading metadata associated with an initial frame of the instance of content, such as a packet identifier ("PID") and a presentation timestamp ("PTS"). For example, while playing the instance of content, the processing unit 224 may select only the PID for the instance of content to be played, while ignoring other PIDs within the file of the plurality of simultaneously recorded instances of content. PIDs are generally identifiers associated with data streams, such as content streams and supplemental data streams, which identify a channel for the data stream. Several PIDs may be associated with one transponder controlled by the content provider 204 and simultaneously recorded utilizing the system of FIG. 1. By identifying or selecting the correct PID for the instance of content being played back from the file, the content receiver 202 may navigate correctly determine which instance of the simultaneously recorded multiple instances of content is to be displayed.

Generally, the content receiver 202 may include multiple tuners 107, demultiplexers 109, descramblers 110 and/or other decoders. In some cases, content may be demodulated from a carrier wave or other signal in order to be reconstructed, recorded, and/or viewed. In many instances, demodulation occurs prior to descrambling. Demultiplexing and descrambling may be considered examples of decoding.

In some embodiments, a single decoder (such as a demultiplexer 109 and/or descrambler 110), or one decoder of any given type, (e.g., one demodulator and one descrambler) may be associated with multiple tuners 107. Each tuner may be adjusted to receive a specific frequency band or transponder. Thus, each tuner may receive a different transponder and thus a variety of instances of content on that transponder.

In such an embodiment, the transponders to which each tuner 107 is tuned may be encoded with a common control word. In this manner, each separate tuner may transmit the multiple instances of content received on the corresponding transponder to a single decoder for processing. Because content associated with the various transponders is commonly encoded, the descrambler 110 may descramble all such content relatively efficiently. These multiple instances of content may then be recorded, as detailed previously. In this manner, multiple tuners may be associated with a single descrambler in order to receive and record multiple instances of content from more than one transponder/frequency band. Accordingly, multiple tuners may be used to receive a greater amount of content than may be carried on a single transponder and all such content may be demultiplexed and/or descrambled by elements common to, and shared by, the tuners. Since a common control word is used to encrypt the content carried on different transponders, a single decoder may handle it all. Thus, the multiple instances of content may be thought of as a first content set and a second content set, each commonly scrambled with a control word but carried on different carrier frequencies.

It should be appreciated that multiple transponders may use the same control word (or other decryption key) even if a single descrambler is not used. That is, multiple transponders may be scrambled with a single control word and one tuner 107 or communications unit 220 may receive corresponding data from each such transponder. Each tuner or unit may transmit the received signal to a descrambler dedicated to that tuner for descrambling, at which point each set of multiple instances of content may be recorded to a storage medium (either separately or in one or more aggregated files).

In alternative embodiments, the multiple instances of content received from multiple transponders may be recorded on the storage medium without descrambling or decryption. Descrambling may occur when the content is played back. That is, the entirety of the multiple instances of content received from the transponders may be stored as a single file (or one file per transponder, in some embodiments) on the storage unit 226 that is still encrypted. The descrambler may decrypt the content only upon playback. In such an embodiment, the scrambled content may be retrieved from the storage medium 226, sent to a single descrambler and descrambled before the operations of identifying and displaying particular content are performed, as described above.

In some embodiments, the system may check to see if content on multiple transponders is scrambled using the same control word. This may be indicated, for example, in metadata corresponding to one or more of the instances of content, or one or more of the transponders. The metadata may identify all content and/or all transponders scrambled with the same control word. Accordingly, the processing unit 224 may receive this metadata and, in response to it, instruct the communications unit 222 to receive data from each of the transponders. The communications unit 222 may have multiple tuners 107 in such an embodiment. Received content may then be stored and replayed as described elsewhere herein. It should also be appreciated that certain embodiments may employ a user command in addition to metadata to instruct the communications unit 222 to receive data. Likewise, a command to receive and record instances of content may be initiated by the content provider 204.

It may be useful or desirable to secondarily encode some subset of the multiple instances of content in addition to encoding it with the common control word. For example, this may permit a subset of content to be delivered to certain users. This subset of content may be additional or enhanced content. As one example, the subset of content may be a "behind the scenes" presentation associated with some other portion of the multiple instances of content, and may be provided only to those users who have paid an additional fee. The subset of content may be related to one or more instances of the other multiple instances of content or may be wholly separate. The users that may access the subset of content may be those who have paid a fee, live in or are otherwise associated with a certain geographic area, users corresponding to certain demographics, and so on.

The subset of content may be scrambled twice—once with the control word common to the multiple instances of content and/or transponders, and once with a specific subkey. Thus, the subset of content may be received and initially descrambled in accordance with other portions of this disclosure, but may remain scrambled by the sub-key although all other instances of content may be fully descrambled. The subset may be recorded along with the rest of the multiple instances of content. It should be appreciated that the descrambling of any or all content may occur either before or after recording the content to the data storage unit 226, as appropriate for the embodiment in question.

In one embodiment, the subset of content may not be played back by anyone other than an authorized user. The subset of content may be received and stored by all but inaccessible to unauthorized users. Unauthorized users may be prevented from playing the recorded subset of content, but may be able to see it in a list of recorded content. The unauthorized user may be presented with an option to unlock the content, such as purchasing it or performing some other action.

In alternative embodiments, the subset of content may be stored with the remainder of the multiple instances of content (either as separate files or in a single file, as appropriate), and be undetectable to unauthorized users. Thus, only authorized users may perceive and/or retrieve the subset of content.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for recording multiple instances of television channels, the method comprising:
   receiving, by a content receiver, one or more instructions to initiate recording by the content receiver;
   in response to the one or more instructions, setting one or more tuners to receive multiple transponder streams, the multiple transponder streams comprising a first transponder stream and a second transponder stream;
   receiving, via the one or more tuners, the first transponder stream comprising a first set of content and the second transponder stream comprising a second set of content, the first set of content and the second set of content scrambled using a same control word, wherein:
      the first transponder stream comprises a first set of television channels, and
      the second transponder stream comprises a second set of television channels;
   descrambling the first set of television channels and the second set of television channels using a single descrambler and the same control word; and
   recording the first set of television channels and the second set of television channels to a storage medium of the content receiver.

2. The method for recording the multiple instances of television channels of claim 1, the method further comprising:
   descrambling, by a descrambler of the content receiver, prior to recording, the first set of television channels and the second set of television channels, wherein the first set of television channels and the second set of television channels are scrambled as received by the one or more tuners.

3. The method for recording the multiple instances of television channels of claim 1, the method further comprising:
   descrambling, by a descrambler of the content receiver, a first television channel from the first set of television channels and the second set of television channels after recording but prior to playback, wherein the first set of television channels and the second set of television channels are scrambled as received by the one or more tuners; and
   after descrambling the first television channel, outputting, by the content receiver, the first television channel from a superset of television channels comprising the first set of television channels and the second set of television channels for playback.

4. The method for recording the multiple instances of television channels of claim 1, wherein the use of the same common control word to scramble the first set of television channels on the first transponder stream and the second set of television channels on the second transponder stream enables the single descrambler to be used for descrambling of the first set of television channels and the second set of television channels.

5. The method for recording the multiple instances of television channels of claim 1, the method further comprising: performing, by the content receiver, a check to determine the same control word is used to scramble the first set of television channels on the first transponder stream and the second set of television channels on the second transponder stream.

6. The method for recording the multiple instances of television channels of claim 5, the method further comprising: receiving, by the content receiver, metadata that indicates the same control word is used to scramble the first set of television channels on the first transponder stream and the second set of television channels on the second transponder stream, wherein performing the check comprises analyzing the metadata.

7. The method for recording the multiple instances of television channels of claim 1, wherein the one or more instructions to initiate recording by the content receiver comprises the one or more instructions being received by the content receiver from a television service provider that transmits the first transponder stream and the second transponder stream.

8. The method for recording the multiple instances of television channels of claim 1, the method further comprising: obtaining, by the content receiver, the single control word from an entitlement control message received as part of the first transponder stream.

9. The method for recording the multiple instances of television channels of claim 1, wherein the first transponder stream and the second transponder stream, as received, are modulated using different carrier frequencies.

10. A content receiver, comprising:
    a first tuner;
    a non-transitory processor-readable storage medium; and
    one or more processors that are configured to:
       receive one or more instructions to initiate recording by the content receiver;

in response to the one or more instructions, set one or more tuners to receive multiple transponder streams, the multiple transponder streams comprising a first transponder stream and a second transponder stream;

receive, via the one or more tuners, the first transponder stream comprising a first set of content and the second transponder stream comprising a second set of content, the first set of content and the second set of content are scrambled using a same control word, wherein:
the first transponder stream comprises a first set of television channels, and
the second transponder stream comprises a second set of television channels;

descramble the first set of television channels and the second set of television channels using a single descrambler and the same control word; and record the first set of television channels and the second set of television channels to the non-transitory processor-readable storage medium.

11. The content receiver of claim 10, further comprising a descrambler that is configured to, prior to recording, descramble the first set of television channels and the second set of television channels, wherein the first set of television channels and the second set of television channels are scrambled as received by the first tuner.

12. The content receiver of claim 10, further comprising a descrambler that is configured to descramble a first television channel from the first set of television channels and the second set of television channels after recording but prior to playback, wherein the first set of television channels and the second set of television channels are scrambled as received by the first tuner.

13. The content receiver of claim 10, wherein the use of the same common control word to scramble the first set of television channels on the first transponder stream and the second set of television channels on the second transponder stream enables the single descrambler of the content receiver to descramble the first set of television channels and the second set of television channels.

14. The content receiver of claim 10, wherein the one or more processors are further configured to perform a check to determine that the same control word is used to scramble the first set of television channels on the first transponder stream and the second set of television channels on the second transponder stream.

15. The content receiver of claim 14, wherein the one or more processors are further configured to receive and analyze metadata to determine the same control word is used to scramble the first set of television channels on the first transponder stream and the second set of television channels on the second transponder stream.

16. The content receiver of claim 10, wherein the one or more instructions to initiate recording by the content receiver are received via the first tuner from a television service provider that transmits the first transponder stream and the second transponder stream and the one or more processors are configured to analyze the one or more instructions to determine that the first set of television channels and the second set of television channels are to be recorded.

17. The content receiver of claim 10, wherein the first tuner is configured to simultaneously receive the first transponder stream and the second transponder stream, which are modulated using different carrier frequencies.

18. A non-transitory processor-readable storage medium for a content receiver that causes recording the multiple instances of television channels comprising processor-readable instructions configured to cause one or more processors to:
receive one or more instructions to initiate recording by the content receiver;
in response to the one or more instructions, set one or more tuners to simultaneously receive multiple transponder streams, the multiple transponder streams comprising a first transponder stream and a second transponder stream, wherein the first transponder stream and the second transponder stream modulated using different carrier frequencies;
receive, via the one or more tuners, the first transponder stream comprising a first set of content and the second transponder stream comprising a second set of content, the first set of content and the second set of content scrambled using a same control word, wherein:
the first transponder stream comprises a first set of television channels, and
the second transponder stream comprises a second set of television channels;
descramble the first set of television channels and the second set of television channels using a single descrambler and the same control word; and
record the first set of television channels and the second set of television channels to the non-transitory processor-readable storage medium.

* * * * *